United States Patent [19]

Uba et al.

[11] 4,259,419

[45] Mar. 31, 1981

[54] VIBRATORY WELDING OF BATTERY COMPONENTS

[75] Inventors: Toshio Uba, Denver; Tristan D. Juergens, Conifer, both of Colo.

[73] Assignee: The Gates Rubber Company, Denver, Colo.

[21] Appl. No.: 67,573

[22] Filed: Aug. 17, 1979

[51] Int. Cl.³ .................. B29C 27/08; H01M 2/04
[52] U.S. Cl. ........................ 429/174; 53/489; 53/328; 156/69; 156/73.1; 156/580.1; 264/23; 425/174.2; 429/175; 429/176
[58] Field of Search ............... 156/73.1, 580.1, 580.2, 156/69, 293; 53/488, 489, 319, 324, 328, DIG. 2; 264/23; 425/174.2; 429/175, 176, 163, 171, 174

[56] References Cited

U.S. PATENT DOCUMENTS

| | | | |
|---|---|---|---|
| 2,849,848 | 9/1958 | Ravn | 53/328 |
| 3,356,552 | 12/1967 | Pearl | 156/69 |
| 3,775,189 | 11/1973 | Jaggard | 156/73.1 |
| 3,824,138 | 7/1974 | Karobath et al. | 156/69 |
| 3,972,758 | 8/1976 | Bieber | 53/DIG. 2 |
| 4,059,294 | 11/1977 | Falcone | 156/73.1 |

*Primary Examiner*—Michael G. Wityshyn
*Attorney, Agent, or Firm*—Curtis H. Castleman, Jr.; Raymond Fink; H. W. Oberg, Jr.

[57] ABSTRACT

Thermoplastic battery cover and container piece parts are fused together using vibratory energy, particularly ultrasonic welding, in which the horn has a depending skirt extending along an outer wall of the container and which serves to maintain the cover and container in mutual alignment and simultaneously contain the flow of the melt (flash). In another aspect, a particular interference joint between the components is described featuring a continuous ramp of 50–70 degrees and producing an interference fit for an improved weld. The invention is also directed to a cell or battery formed according to the method of the invention, as well as the horn.

6 Claims, 7 Drawing Figures

VIBRATORY WELDING OF BATTERY COMPONENTS

BACKGROUND OF THE INVENTION

This invention relates to joining heat sealable components using vibratory energy, particularly to the ultrasonic welding of thermoplastic covers and containers of an electrochemical cell or battery.

Ultrasonic welding has been used to assemble thermoplastic battery components together, as taught for instance, in U.S. Pat. Nos. 3,775,189 and 3,981,759. The ultrasonic welding technique as applied to sealed cylindrical electrochemical cells illustrated in FIGS. 1–4, and hereinafter described more fully, is also known to Applicants. However, these prior methods suffer from one or more drawbacks, especially with respect to misalignment of the components, excess flashing of the melt, required use of clamping, and insufficient and non-uniform fusing of the parts together, all of which lead to the production of an unacceptably high percentage of "leakers". These problems have been found to be particularly prevalent when joining crystalline polymers, particularly polypropylene, into an hermetically sealed joint for containment of the electrolyte.

Additional prior art known to Applicants includes Branson Technical Information Bulletin PW-3, printed 5/78.

SUMMARY OF THE INVENTION

Briefly described, in one aspect the invention is directed to a method for joining together in sealed relationship a heat sealable cover to a heat sealable open-mouthed container of an electrolyte-tight electrochemical cell or battery using vibratory energy, including the steps of (a) disposing the cover in mating relationship within the mouth of the container thereby defining a mutual joint; (b) positioning a resonant tool adjacent the cover in the area of the joint, said tool (e.g., horn) being provided with a depending skirt which extends along an outer wall of the container and beyond the joint, and (c) energizing (resonating) the tool to cause the cover and container to undergo relative reciprocating translating motion sufficient to melt the cover and container materials in the area of the joint and cause them to flow and fuse together in sealed relation, the depending skirt serving to maintain the cover and container in mutual alignment and to contain the flow of the melt of the outer wall of the container during energization of the tool.

In another aspect, the invention pertains to the resultant hermetically sealed cover/container of the cell or battery made in accordance with the foregoing method.

In another aspect, the invention pertains to a method for fusing together in sealed relation a thermoplastic circular cover and an open-mouthed cylndrical thermoplastic container using ultrasonic vibratory energy, including the steps of (a) providing one of the cover and container with a continuous ramp making an angle with the plane of the cover from about 50 to about 70 degrees; (b) providing the other of said cover and container with a multiple step surface including an energy concentrator portion; (c) matingly engaging the cover in the mouth of the container with an interference fit so that the energy concentrator portion makes contact with the ramp; and (d) ultrasonically welding the cover and container together using a horn pressed against the cover and energized to cause the cover and container to undergo relative reciprocating motion axially with respect to the container, and to melt and fuse together in the vicinity of the ramp.

In still another aspect, the invention pertains to the aforementioned horn, directed particularly to the skirt depending therefrom.

BRIEF DESCRIPTION OF THE DRAWINGS

The invention will be more particularly described in certain of its preferred embodiments by reference to the accompanying drawings, wherein like numerals designate like parts, and in which.

PREFERRED EMBODIMENTS OF THE INVENTION

Figure 1:
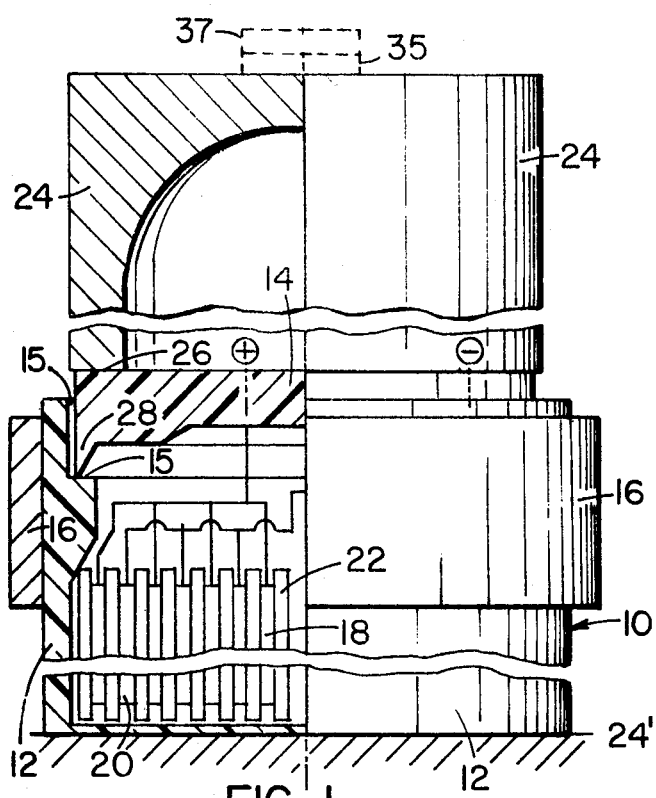
FIG. 1 is a partial sectional elevational view of a prior art tool and workpiece arrangement for ultrasonically welding a cover to a container of an electrochemical cell.
Figure 2:
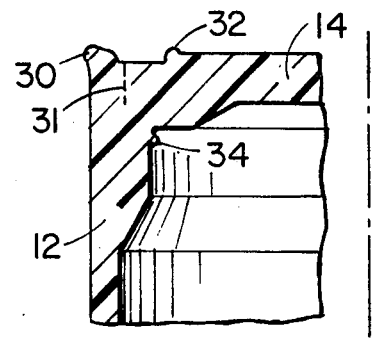
FIG. 2 is a partial sectional view depicting a typical finished welded joint derived from the FIG. 1 assembly of elements.

A known technique for ultrasonically welding components of a spirally wound cylindrical electrochemical cell is shown in FIGS. 1 and 2. The cell, generally shown at 10, includes a cylindrical open-mouthed polypropylene container 12 and a mating top cover 14 also of polypropylene to be fused together along annular joint 15. For illustrative purposes only, the cell houses spirally wound positive plate 18, negative plate 20, and interposed separator 22, with the appropriate opposite polarity terminals shown schematically penetrating the cover member 14. For a detailed illustration of such a spirally wound cell pack and terminal connections, reference is made to U.S. Pat. Nos. 3,704,173 and 3,862,861 to McClelland et al. A liquid electrolyte, such as sulfuric acid, is contained within the cell pack of plates and separators.

In accordance with the prior method, the top 14 is matingly engaged in the mouth of container 12 as shown in FIG. 1, and held tight in a fixture or support (not shown) together with side clamp 16. The assembly is then positioned adjacent ultrasonic welding horn 24 with the face 26 of the horn positioned against cover 14 in the area of joint 15, and above energy director or concentrator 28. In the customary manner, the other (top) end surface of horn 24 is coupled to a converter 35 driven by power supply 37. The end surface 24 may be tapered and carry a threaded member (not shown) for positive coupling to the converter in known manner. As is well known, the power supply may consist of an ultrasonic generator that supplies high frequency electrical energy at 20,000 Hz or the like. The converter may be any motor or transducer which receives electrical energy from the power supply and converts this electrical energy into mechanical vibration, for instance of the piezoelectric or magnetostrictive type. The mechanical vibration developed by the converter is transferred to the horn, which is normally a one-half wave length long resonant metal section (e.g., circular in the example) which transfers the energy from the converter to the electrochemical cell workpiece 10 and particularly to the top cover 14, with the container 12 normally being held stationary.

The particular design of the horn will be dictated by the shape of the thermoplastic parts being ultrasonically welded, the displacement amplitude desired, and the particular gain required. As is known, energization of the horn causes it to oscillate in the axial direction causing the cover 14 with the aid of energy concentrator 28 to undergo reciprocating translating motion which causes high frictional forces to melt the cover and container materials in the area of joint 15, and to flow and fuse together in sealed relation as shown in FIG. 2. A portion 31 of the joint may not fully fuse together.

Figure 4:
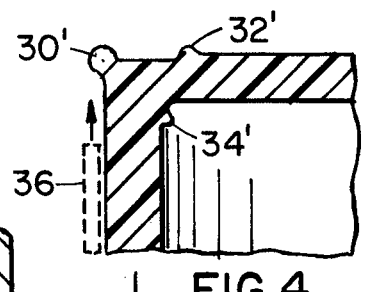
FIG. 4 shows the resultant weld based on the FIG. 3 arrangement, and similar to the fused joint depicted in FIG. 2.
Figure 3:
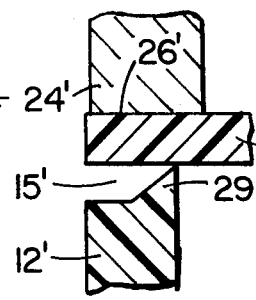
FIG. 3 is a partial sectional view similar to FIG. 1, however, showing an alternative prior art joint configuration.

Similarly, with the alternative joint design shown in FIG. 3 of the prior art, joint 15' is defined by the mating relationship of cover 14' and container wall 12' provided with an inboard upstanding energy concentrator 29. The parts are ultrasonically welded together upon energization of horn 24' whose face 26' oscillates at high frequency causing a melting and fusing of the cover and container together, to produce the unitary configuration exemplified by FIG. 4. With each of the configurations of FIGS. 2 and 4, undesirable flash 30, 32, 34 and 30', 32', 34', respectively, is formed. An especially grave problem is presented by the outside flash 30, 30' since the cell may be later encapsulated in a tight-fitting metal outer container 36 which, as shown by the arrow, oftentimes has insufficient clearance with respect to the flash and tends to shear it off upon insertion of the welded element into the metal container. This, in turn, oftentimes leads to disruption of the seal and leakage of gas or electrolyte at this location.

Figure 5:
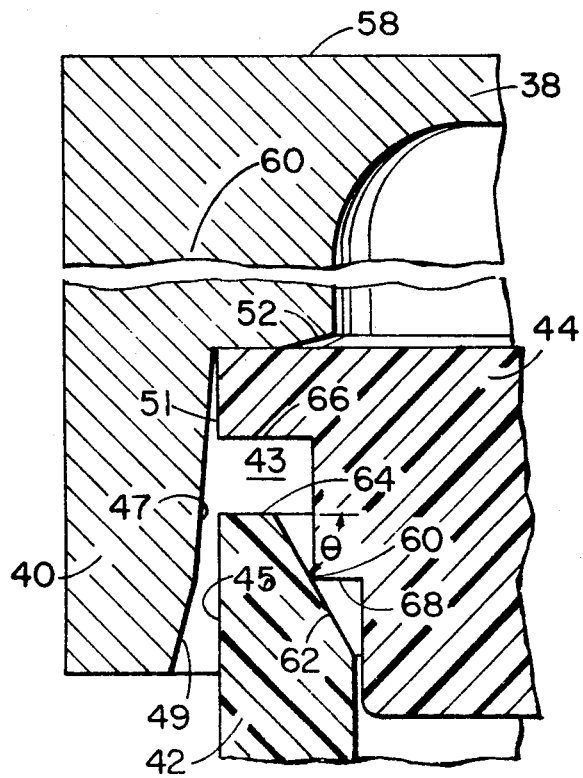
FIG. 5 is a partial sectional view similar to FIG. 1 illustrating a horn and joint design in accordance with the invention.

In accordance with one aspect of the invention, as shown in FIG. 5, horn 38, of the same basic circular design as horn 24 shown in FIG. 1, is modified to include a continuous annular depending skirt 40 which extends circumferentially around joint area 43 (defined by the mating engagement of thermoplastic top 44 in the mouth of the open-mouthed cylindrical container 42). It is critical that skirt 40 extends downwardly at least to substantially enshroud the joint area 43, and more preferably extends well down the outer wall 45 of the container 42. The inner bore of the skirt is preferably provided with a first tapered portion 49 to facilitate engagement of the parts, interconnected with the critical surface 47 which is positioned in close proximity to the container wall 45 and cover wall 51. The wall 47 is also preferably tapered slightly with respect to the axis of the cell, e.g., from about ¼ to about 4 degrees to facilitate separation of the horn from the ultrasonically welded part, although the wall can be vertical.

Figure 6:
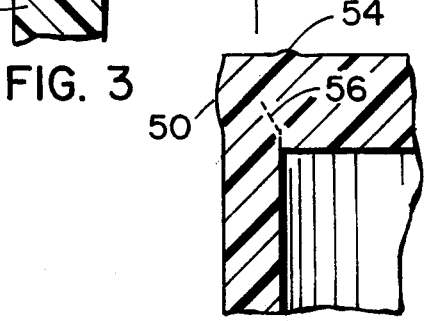
FIG. 6, similar to FIGS. 2 and 4, illustrates the resultant welded joint derived from the assembly illustrated in FIG. 5.

The surface 47 should be sufficiently close to the workpiece and joint area to restrict flow of the flash resulting from the ultrasonic welding operation. In practice, a maximum clearance between surface 47 of the skirt and outer wall 45 of the container may be from about 0.001 to about 0.016 inches, but it is preferred that this range be narrowed to within from about 0.002 to about 0.006 inches. A slight bulging of flash material in the finished welded article, shown exaggerated at 50 in FIG. 6 may be tolerated, depending upon the tolerances involved in the specific application.

The horn face 52 also preferably has a slight radius or taper at its radial inward portion which tends to minimize flash hump 54. It will also be noted that, depending upon the frequency range and power rating of the supply (e.g., 2,000–10,000 watts) the interface between the container wall 42 and top 44 may not be completely fused together, as shown in phantom at 56. As also with the case of the prior art methods, the interface may not have to be fully fused together to provide a reliable, preferably hermetic seal.

The horn may be made of any typical material such as aluminum or titanium. The horn preferably will be substantially at its resonant frequency so that the horn tends to expand and contract alternately at the resonant frequency whereby horn face 52 and upper end surface 58 are displaced alternately toward and away from one another and with respect to nodal area 60.

The depending skirt 40 serves the dual function of maintaining relative alignment of cover 44 within the mouth of container 42 throughout the welding and cooling cycle, but also controls and minimizes, if not totally eliminating generation of side flash at the joint area.

In accordance with another aspect of the invention, the specific joint design of FIG. 5 has proved especially advantageous in the reduction of welding defects. The afore-mentioned Branson technical publication, particularly in FIG. 7, discloses a shear joint used for welding the difficult crystalline resins (e.g., polypropylene) together. In that reference, an interference fit is recommended with one of the container or cover elements being tapered in the range from 30–45 degrees. In accordance with that publication, with the shear joint welding is accomplished by first melting a small initial contact area (i.e., energy concentrator point) and then continuing to melt with a controlled interference along the vertical walls as the container and cover portions telescope together. It has been found in accordance with this aspect of the invention that the ramp angle of 30–45 degrees is not satisfactory, but rather the ramp 62 should extend at an angle $\theta$ of approximately 60 degrees with respect to the horizontal (a plane normal to the axis 69 of the cell), with satisfactory results being obtained when $\theta$ ranges from about 50 to about 70 degrees, with the narrowed range of 55–65 degrees being more preferred.

In addition to the relatively steep ramp 62, the container wall carries a flat 64. The mating cover member 44 is provided with a multiple stepped surface (steps 66, 68, defining the intermediate energy concentrator portion 60) therebetween making contact with wall 42 medially along ramp 62.

Figure 7:
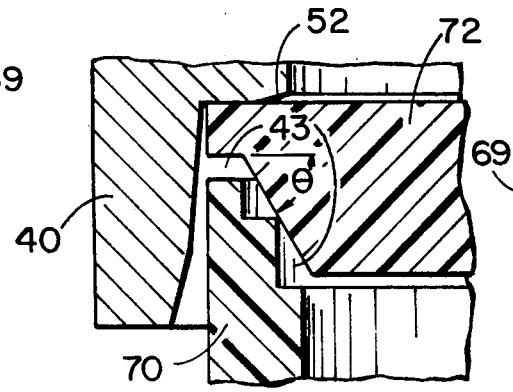
FIG. 7 depicts an alternative joint configuration useful in accordance with the invention.

In the alternative embodiment shown in FIG. 7, basically the same arrangement is shown as in FIG. 5 with the exception that container wall 70 is provided with the stepped surface, and cover 72 is provided with the relatively steep ramp. As in the case of FIG. 5, activation of the horn causes the cover and container to undergo relative reciprocating translating motion in the direction of the axis of the cell sufficient to melt the cover and container materials in the area of the joint 43 and cause them to flow and fuse together in sealed relation, very similar to the final configuration shown in FIG. 6.

In actual practice in the ultrasonic welding of spirally wound 2-volt-25 AH sealed lead-acid cells, the technique of FIG. 1 using the joint shown in FIG. 3 resulted in approximately 60 percent "leakers". In contrast, in accordance with the invention utilizing the joint configuration and depending horn skirt of FIG. 5, the amount of leakers was reduced to only about 1 percent.

While certain representative embodiments and details have been shown for the purpose of illustrating the invention, it will be apparent to those skilled in this art that various changes and modifications may be made therein without departing from the spirit or scope of the invention. For instance, while the joining of cylindrical and circular plastic components of batteries have been shown, clearly the teaching of the invention is applicable to the joining of heat sealable rectangular or other shaped parts together.

What is claimed is:

1. A method for fusing together in sealed relation a thermoplastic circular cover and an open-mouthed cylindrical thermoplastic container using ultrasonic vibratory energy, comprising:
   providing one of said cover and container with a continuous ramp making an angle with the plane of the cover from about 50° to about 70°;
   providing the other of said cover and container with a multiple stepped surface including an energy concentrator portion;
   matingly engaging the cover in the mouth of the container with an interference fit so that the energy concentrator portion makes contact with the ramp; and
   ultrasonically welding the cover and container together using a horn pressed against the cover and energized to cause the cover and container to undergo relative reciprocating motion axially with respect to the container, and to melt and fuse together in the vicinity of the ramp.

2. The method of claim 1 wherein said angle is from about 55 to about 65 degrees.

3. A method for fusing together in sealed relation a crystalline thermoplastic circular cover member and an open-mouthed crystalline thermoplastic container using ultrasonic vibratory energy, comprising:
   providing one of said cover and container with a continuous ramp making an angle with the plane of the cover from about 50 to about 70 degrees;
   providing the other of said cover and container with a multiple stepped surface including an energy concentrator portion;
   matingly engaging the cover in the mouth of the container so that the energy concentrator portion makes contact with the ramp;
   positioning a resonant tool adjacent the cover in the area of said mating engagement, said tool being provided with an annular depending skirt which extends along an outer wall of the cylindrical container and beyond and in immediate adjacent proximity to the area of mating engagement; and
   energizing said tool to cause the cover and container to undergo relative reciprocating translating motion along the axis of the cylindrical container sufficient to melt the cover and container materials in the area of mating engagement and cause them to flow and fuse together in sealed relation, the depending skirt serving to maintain the cover and container in mutual alignment and to contain the flow of the melt at the outer wall of the container during energization of the tool.

4. A method for joining together in sealed relationship a heat sealable cover to a heat sealable open-mouthed container of an electrolyte-tight electrochemical cell or battery using vibratory energy, comprising:
   disposing the cover in mating relationship within the mouth of the container thereby defining a mutual joint which extends to the outer wall of the container, one of said cover and container being provided with a ramped surface making an angle with the plane of the cover from about 50 to about 70 degrees, and the other said cover and container being provided with a multiple stepped surface including an energy concentrator portion;
   positioning a resonant tool adjacent the cover in the area of the joint, said tool being provided with a depending skirt which extends along the outer wall of the container and beyond and in immediate adjacent proximity to the joint; and
   energizing said tool causing the energy concentrator portion to make contact with the ramped surface and the cover and container to undergo relative reciprocating translating motion sufficient to melt the cover and container materials in the area of the joint and cause them to flow and fuse together in sealed relation, the depending skirt serving to maintain the cover and container in mutual alignment and to contain the flow of the melt at the outer wall of the container during energization of the tool.

5. The method of claim 4 wherein the cover is stepped and the container is ramped at an angle from about 55 to about 65 degrees.

6. A fused together integral cover and container in an electrochemical cell or battery made in accordance with the method of claim 4.

* * * * *